2,848,314

PRODUCTION OF ROASTING PRODUCTS PRACTICALLY FREE FROM COPPER

Adolf Johannsen and Georg Wittmann, Ludwigshafen (Rhine), and Alfred Dietrich and Werner Gebhard, Duisburg, Germany, assignors to Badische Anilin- & Soda-Fabrik Aktiengesellschaft, Ludwigshafen (Rhine), Germany No Drawing. Application August 7, 1956
Serial No. 602,516

Claims priority, application Germany August 9, 1955

9 Claims. (Cl. 75—9)

This invention relates to a process for the production of practically copper-free roasted products by thermal splitting and magnetizing roasting of copper-containing siderite or copper-containing ferromanganese spar with preheated oxygen-containing gases with addition of a small amount of chlorine or a gaseous chlorine compound in a fluidized layer of particles of the material being treated.

It has already been proposed to effect thermal splitting and magnetizing roasting of siderite and ferromanganese spar in a fluidized layer by treatment with preheated oxygen-containing gases at temperatures of 400° to 800° C., preferably 500° to 650° C. From the roasted material there is prepared by magnetic separation an iron-manganese oxide concentrate which is mainly used in the blast furnace as a manganese carrier.

The siderite or iron-manganese spars hitherto discovered have seldom been entirely free from copper. Usually they contain 0.3 to 1% of copper, and many spars exhibit an even higher copper content. From the roasted material obtained by thermal splitting and magnetizing roasting of these spars, no iron oxide or ferromanganese oxide free from copper can be obtained by magnetic dressing alone.

On the other hand the iron ore including the flux for the production of pig iron in the blast furnace must not have a copper content higher than 0.10% because the copper remains in the iron and consequently a pig iron with about 0.15% of copper would result. For the production of many special kinds of iron, however, a pig iron with 0.15% of copper cannot be used as an initial material because for these special kinds a pig iron must be used with less than 0.10%, indeed less than 0.07%, of copper.

The removal of the copper from the ores containing the desired alloy components, such as manganese, is the more necessary today because copper-containing scrap is worked up in the blast furnace and also roasted pyrites containing small amounts of copper are introduced in a considerable degree into the blast furnace.

Removal of the copper from siderite and ferromanganese spars by means of the usual chloridizing roasting and subsequent leaching is not economical by reason of the low copper content of the spars of usually below 0.5%.

We have now found that the copper can be practically completely removed in the thermal splitting and magnetizing roasting of copper-containing siderite or ferromanganese spar by carrying out the thermal splitting and magnetizing roasting with the addition of a small amount of chlorine or a gaseous chlorine compound, such as hydrogen chloride or phosgene, in a layer of particles of the material to be treated maintained in fluidized motion by oxygen-containing gases introduced into the layer from below and by the carbon dioxide formed by the thermal splitting, at a temperature of about 800° to 1,200° C., preferably 850° to 900° C., copper-containing siderite or ferromanganese spar being supplied to the layer continuously or periodically and treated material removed in a corresponding amount. The amount of chlorine or gaseous chlorine compound to be introduced into the layer is so regulated that it amounts to up to about 5% by volume, preferably to 1 to 2% by volume, with reference to the atmosphere in the reaction vessel. This amount is sufficient in order to remove the copper from the ore being treated down to a content of 0.03% or less.

It is sufficient to introduce the chlorine or gaseous chlorine compound into the fluidized layer at a point above the supply of oxygen-containing gas because the intensive turbulence in the layer brings about a sufficiently uniform distribution of the chlorine or gaseous chlorine compound in the layer. In the case of large reaction vessels it is recommended that the chlorine or gaseous chlorine compound be introduced through a plurality of, for example three, nozzles into the layer for the purpose of better distribution.

The height of the fluidized layer, with reference to the quiescent state, is preferably kept below 2 metres.

The volatilization of the copper may be promoted by regulating the oxygen partial pressure of the gas mixture leaving the fluidized layer to such a value that an overoxidation of the material being roasted is avoided. This oxygen partial pressure is achieved in practice by supplying the preheated oxygen-containing gas and the siderite or ferromanganese spar to the fluidized layer in such proportions that the oxygen contained in the preheated gas is just sufficient to oxidize the iron contained in a substantially manganese-free siderite to ferrosoferric oxide or, when using ferromanganese spar, to convert the iron into ferric oxide while the manganese remains divalent. Thus, with only small amounts of manganese or a substantially manganese-free siderite, sufficient oxygen is employed to oxidize the iron to a ferrosoferric oxide in which part of the iron remains divalent, whereas with larger quantities of manganese as are contained in a ferromanganese spar, the iron may be completely oxidized and only the manganese remains divalent.

In order to carry out the process, the oxygen-containing gas is preheated and introduced into the fluidized layer; however, the heat requirement of the reaction may be wholly or partly covered by the direct introduction of gaseous, liquid or solid fuels into the fluidized layer.

The efficacy of the process according to the present invention may be seen from the following comparison:

In the usual thermal splitting and magnetizing roasting without the addition of chlorine in the case of a ferromanganese spar which contains 26.0% of iron, 23.8% of carbon dioxide, 27.3% of silicon dioxide, 5.1% of manganese and 0.20% of copper there is obtained by the subsequent magnetic working up an iron-manganese concentrate containing 52.8% of iron, 10.2% of manganese and 0.37% of copper.

If the same spar is roasted by the process according to the present invention there is obtained, after magnetic working up, a concentrate which contains 52.7% of iron, 9.9% of manganese and 0.02% of copper.

In copper-containing siderites and also in copper-containing ferromanganese spars the copper is almost exclusively combined in sulfidic form and accompanied by small amounts of zinc, arsenic, antimony, tin and lead. These accompanying metals of the copper are removed with the copper when using the process according to the present invention. This process is especially suitable in the case of already highly concentrated iron or ferromanganese carbonates in order to obtain a pure magnetic concentrate which can be introduced into the blast furnace without disturbance.

The following examples will further illustrate this invention but the invention is not restricted to these examples.

Example 1

Ferromanganese spar, which has a grain size up to 4 millimetres and contains 26.% of iron, 23.8% of carbon dioxide, 5.1% of manganese and 0.20% of copper, is continuously introduced into a fluidized layer or roasted material, 60 centimetres high in the quiescent state, which is kept in fluidized motion by air preheated to 480° C. which is introduced from below into the layer at a pressure of 0.6 metre water column.

By heating the layer to 850° C., the thermal splitting and magnetising roasting of the ferromanganese spar is initiated. As soon as a temperature of 830° C. has been reached in the layer, 2% by volume, with reference to the atmosphere in the reaction vessel, of chlorine are introduced into the layer above the air supply. The temperature thereby rises to 850° to 870° C. The finally treated material is withdrawn from the layer continuously or periodically. The throughput amounts to 2.1 metric tons of ferromanganese spar per hour per square metre of the basal surface of the reaction vessel. The roasted material withdrawn, after magnetic dressing, yields a concentrate containing 52.5% of iron, 9.9% of manganese and 0.02% of copper.

Example 2

Ferromanganese spar with a grain size up to 5 millimetres which contains 40.6% of iron, 0.61% of manganese, 0.38% of copper, 0.08% of zinc, 0.09% of arsenic, 0.05% of antimony, 0.02% of tin, 0.09% of lead, 5.60% of silicon dioxide, 2.40% of calcium oxide, 0.91% of magnesium and 35.8% of carbon dioxide is continuously introduced into a fluidized layer of roasted material which is 70 centimetres high in the quiescent state and which is kept in fluidized motion by air preheated to 460° C. which is introduced into the layer from below under a pressure of 0.75% metre water column.

The roasting of the ferromanganese spar is initiated by preheating. The temperature of the layer is regulated at 860° C. and 1.8% by volume of chlorine, with reference to the atmosphere of the reaction vessel, are introduced into the layer. The roasted material is continuously or periodically withdrawn from the layer. The throughput amounts to 1.95 metric tons of ferromanganese spar per hour per square metre of basal surface of the fluidized layer. The roasted material withdrawn and subjected to magnetic dressing yields a concentrate of the following composition: 66.3% of iron, 0.98% of manganese, 0.02% of copper, 0.01% of zinc, less than 0.01% of arsenic, less than 0.01% of antimony, less than 0.01% of tin, 0.015% of lead, 2.55% of silicon dioxide, 0.20% of calcium oxide, 0.11% of magnesium and 0.12% of carbon dioxide.

We claim:

1. An improved thermal splitting and magnetising roasting process for the production of an oxide concentrate containing a minimum quantity of copper from a copper-containing spathic iron ore of the group consisting of siderite and ferromanganese spar which comprises: magnetising roasting said spathic iron ore as particles in a fluidized layer by reaction with an oxygen-containing gas at a temperature of about 800° C. to 1200° C. whereby carbon dioxide is released by thermal splitting, said particles being maintained in fluidized motion by the oxygen-containing gas and the released carbon dioxide; introducing into said fluidized layer a chlorine-containing gas in an amount up to 5% by volume, with reference to the atmosphere in the reaction zone; removing roasted ore from said fluidized layer; and magnetically separating an iron oxide concentrate from said roasted ore, said concentrate being substantially free of copper.

2. An improved process as claimed in claim 1, wherein the magnetically separated iron oxide concentrate contains not more than 0.10% by weight of copper.

3. An improved process as claimed in claim 1, wherein the magnetically separated iron oxide concentrate contains not more than 0.03% by weight of copper.

4. An improved thermal splitting and magnetising roasting process for the production of an oxide concentrate containing a minimum quantity of copper from a copper-containing spathic iron ore of the group consisting of siderite and ferromanganese spar which comprises: magnetising roasting said spathic iron ore as particles in a fluidized layer by reaction with an oxygen-containing gas at a temperature of about 800° C. to 1200° C. whereby carbon dioxide is released by thermal splitting, said particles being maintained in fluidized motion by the oxygen-containing gas and the released carbon dioxide; introducing into said fluidized layer a chlorine-containing gas of the group consisting of gaseous chlorine, hydrogen chloride and phosgene in an amount of about 1% up to 5% by volume, with reference to the atmosphere in the reaction zone; removing roasted ore from said fluidized layer; and magnetically separating an iron oxide concentrate from said roasted ore, said concentrate containing not more than 0.10% by weight of copper.

5. An improved thermal splitting and magnetising roasting process for the production of an oxide concentrate containing a minimum quantity of copper from a copper-containing spathic iron ore of the group consisting of siderite and ferromanganese spar which comprises: magnetising roasting said spathic iron ore as particles in a fluidized layer by reaction with an oxygen-containing gas at a temperature of about 850° C. to 950° C. whereby carbon dioxide is released by thermal splitting, said particles being maintained in fluidized motion by the oxygen-containing gas and the released carbon dioxide; introducing into said fluidized layer a chlorine-containing gas of the group consisting of gaseous chlorine, hydrogen chloride and phosgene in an amount of about 1% to 2% by volume, with reference to the atmosphere in the reaction zone; removing roasted ore from said fluidized layer; and magnetically separating an iron oxide concentrate from said roasted ore, said concentrate containing not more than 0.10% by weight of copper.

6. An improved thermal splitting and magnetising roasting process for the production of an iron oxide concentrate containing a minimum quantity of copper from a copper-containing spathic iron ore of the group consisting of siderite and ferromanganese spar which comprises: magnetising roasting said spathic iron ore as particles in a fluidized layer having a height of below 2 meters by reaction with an oxygen-containing gas at a temperature of about 800° C. to 1200° C. whereby carbon dioxide is released by thermal splitting, said particles being maintained in fluidized motion by the oxygen-containing gas which is introduced from below said layer and by the released carbon dioxide; introducing into said fluidized layer a chlorine-containing gas of the group consisting of gaseous chlorine, hydrogen chloride and phosgene in an amount of about 1% up to 5% by volume, with reference to the atmosphere in the reaction zone; removing roasted ore from said fluidized layer; and magnetically separating an iron oxide concentrate from said roasted ore, said concentrate containing not more than 0.10% by weight of copper.

7. An improved thermal splitting and magnetising roasting process for the production of an oxide concentrate containing a minimum quantity of copper from a copper-containing spathic iron ore of the group consisting of siderite and ferromanganese spar which comprises: magnetising roasting said spathic iron ore as particles in a fluidized layer by reaction with an oxygen-containing gas at a temperature of about 800° C. to 1200° C. whereby carbon dioxide is released by thermal splitting, said particles being maintained in fluidized motion by the oxygen-containing gas which is introduced from below said layer and by the released carbon dioxide; introducing into said fluidized layer, at a point above the point of introduction of said oxygen-containing gas, a chlorine-containing gas of the group consisting of gaseous chlorine, hydrogen chloride and phosgene, in an amount of about 1% up to 5% by volume, with reference to the atmosphere in the reaction zone; removing roasted ore from said fluidized layer; and magnetically separating an iron oxide concentrate from said roasted ore, said concentrate containing not more than 0.10% by weight of copper.

8. An improved thermal splitting and magnetising roasting process for the production of an oxide concentrate containing a minimum quantity of copper from a copper-containing ferromanganese spar which comprises: magnetising roasting said ferromanganese spar as particles in a fluidized layer by reaction with a quantity of an oxygen-containing gas sufficient to oxidize the iron content but not the manganese content of said spar at a temperature of about 800° C. to 1200° C., whereby carbon dioxide is released by thermal splitting, said particles being maintained in fluidized motion by the oxygen-containing gas and the released carbon dioxide; introducing into said fluidized layer a chlorine-containing gas of the group consisting of gaseous chlorine, hydrogen chloride and phosgene in an amount of about 1% up to 5% by volume, with reference to the atmosphere in the reaction zone; removing roasted ore from said fluidized layer; and magnetically separating an iron oxide concentrate from said roasted ore, said concentrate containing not more than 0.10% by weight of copper.

9. An improved thermal splitting and magnetising roasting process for the production of an oxide concentrate containing a minimum quantity of copper from a copper-containing siderite substantially free of manganese which comprises: magnetising roasting said siderite substantially free of manganese as particles in a fluidized layer by reaction with a quantity of an oxygen-containing gas sufficient to oxidise the iron content of said siderite to ferrosoferric oxide, part of the iron remaining divalent, at a temperature of about 800° C. to 1200° C., whereby carbon dioxide is released by thermal splitting, said particles being maintained in fluidized motion by the oxygen-containing gas and the released carbon dioxide; introducing into said fluidized layer a chlorine-containing gas of the group consisting of gaseous chlorine, hydrogen chloride and phosgene in an amount of about 1% up to 5% by volume, with reference to the atmosphere in the reaction zone; removing roasted ore from said fluidized layer; and magnetically separating an iron oxide concentrate from said roasted ore, said concentrate containing not more than 0.10% by weight of copper.

References Cited in the file of this patent

UNITED STATES PATENTS

| 2,730,441 | Crowley | Jan. 10, 1956 |
| 2,772,153 | West | Nov. 27, 1956 |

FOREIGN PATENTS

| 696,003 | Great Britain | Aug. 19, 1953 |